United States Patent [19]

Zehrung, Jr.

[11] 4,168,079

[45] Sep. 18, 1979

[54] MOVABLE CARRIER FOR STORING AND TRANSPORTING NORMALLY ELONGATED PARTS

[75] Inventor: Claude D. Zehrung, Jr., Denver, Colo.

[73] Assignee: Bluebird International, Inc., Englewood, Colo.

[21] Appl. No.: 870,725

[22] Filed: Jan. 19, 1978

[51] Int. Cl.² .............................................. B62B 3/10
[52] U.S. Cl. ............................... 280/47.35; 211/60 R; 280/79.1 A
[58] Field of Search .......... 280/47.35, 79.1 A, 79.1 R, 280/79.2, 179 A, DIG. 6; 211/60 R, 60 A, 60 T, 65, 13; 248/314

[56] References Cited

U.S. PATENT DOCUMENTS

| | | | |
|---|---|---|---|
| D. 185,203 | 5/1959 | Hollinger | 280/47.35 |
| D. 193,772 | 10/1962 | Brunette | 280/79.1 R |
| 3,273,846 | 9/1966 | De Mare | 248/314 |
| 3,710,997 | 1/1973 | Asikainen | 211/60 R |
| 3,738,677 | 6/1973 | Renock | 280/DIG. 6 |
| 3,759,538 | 9/1973 | Fabiano | 280/47.35 |
| 4,011,974 | 3/1977 | Scarola | 280/179 A |

Primary Examiner—Robert R. Song
Attorney, Agent, or Firm—Horace B. Van Valkenburgh; Frank C. Lowe

[57] ABSTRACT

The movable carrier includes a series of upright sockets corresponding in peripheral contour to the parts to be stored in upright position therein, spaced, lower base plates for supporting the sockets and an upper reinforcing plate extending longitudinally between the sockets on the respective base plates, with a cutout in the reinforcing plate for each socket having a greater lateral extent. A cross plate extends transversely of the base plate for supporting one or more additional parts. The lower end of a cylindrical part rests on or is connected to the reinforcing plate and rests in inclined position against a semicircular cup mounted on an upstanding bracket. Casters are attached to the underside of a transverse front plate and the tow handle pivotally mounted on the top of the front plate, while wheels and an upstanding handle are mounted at the rear, to permit the carrier to be pulled similar to a dolly, or tipped rearwardly and moved similar to a hand truck. A flexible strap extends around the upright parts and is hooked to the legs of the rear handle.

15 Claims, 10 Drawing Figures

MOVABLE CARRIER FOR STORING AND TRANSPORTING NORMALLY ELONGATED PARTS

This invention relates to movable carriers for storing and transporting normally elongated parts, particularly parts of devices adapted to be disassembled for storage and transportation and reassembled for use.

The carrier of this invention is useable in a manner corresponding to either a hand truck or dolly and is particularly useful for receiving, for storage or transportation purposes, the parts of a knockdown lift crane, but is also adapted to receive, for a similar purpose, normally elongated parts of other types of devices. Such a knockdown lift crane may be of the type particularly adapted for lifting engines from automobiles, pulling tree stumps and fence posts, lifting boulders, barrels, boxes and other heavy objects, and is handy in automotive repair shops, industrial plants, building supply yards and on farms. It may include, as in U.S. Pat. No. 3,521,860, a pair of elongated legs, each having a roller at its outer end and adapted to interfit with a transverse axle having sockets for reception of the legs and casters on the underside, together with an upstanding socket for receiving an upright mast. The mast may be provided with a transverse handle for moving the crane to different positions, as well as means at its upper end for pivotal connection with a boom extending in the same direction as the legs and intermediate means for pivotal attachment of a jack having an extendable and retractable rod pivotally connected to the underside of the boom. The load is normally attached, as by a sling or cable or the like, to a hook carried at the outer end of the boom. Due to the length of the legs and the boom, the crane requires an undue amount of floor space when not in use, although due to its disassembly characteristics, the crane parts may be separated. However, due to the difference in length of various parts, as well as the protuberances on them, including the rollers on the legs, the casters and sockets on the axle and the handle on the mast, as well as the cylindrical rather than generally rectangular, lateral shape of the jack, the storage of the disassembled parts requires an undue amount of space in a horizontal bin, or merely piled together on the floor. When used as rental equipment, the parts are generally transported in disassembled condition, as in a car trunk or the like, but movement of the parts from a place of storage to the car requires either more than one person to carry the parts, or the piling of the parts on a normal hand truck or dolly.

Thus, among the objects of this invention are to provide a movable carrier on which may be received generally elongated parts, particularly of a device whose parts can be disassembled and reassembled; to provide such a carrier which occupies a minimum of floor space; to provide such a carrier which maintains each of the parts in a stable position; and to provide such a carrier which permits the parts to be readily placed on or removed from the carrier. Further objects are to provide such a carrier which may be used either in the manner of a hand truck, i.e. moved about in a tipped position on two wheels, or as a dolly, such as being towed by a handle; and to provide such a carrier which is particularly rugged in construction but generally avoids the use of excess material.

SUMMARY OF THE INVENTION

The carrier of this invention generally comprises a frame which carries one or more upstanding sockets having a peripheral contour corresponding to one end of a generally elongated part to be received by the socket and maintained in upright position. For parts having a non-rectangular end, a bearing surface may be provided with flanges or the like adapted to prevent lateral movement of the part. A cylindrical part may be supported in tipped position, resting against a support having a semicircular cup or the like to engage the cylindrical portion, while the lower end of the cylindrical part engages the frame or is connected thereto. The frame may be provided with rear wheels and a rear handle by which the frame may be tipped for use in a manner similar to that of a hand truck, which handle also provides connection points for a flexible strap or the like passed around the parts supported by the frame. The front of the frame may be provided with supporting casters and a tow handle which may be used in pulling the frame, with the parts thereon, from one place to another, the casters permitting desired turning movements, while the tow handle may be pivoted so as to be tipped rearwardly, when not in use, against the parts on the frame. Particularly when a plurality of sockets are utilized, the sockets may be supported at the bottom by spaced longitudinal plates and reinforced by an upper plate which extends between sockets on each side. One or more edges of the reinforcing plate may have a slot contoured to correspond to the shape of a socket, particularly in the case of different sized sockets. A lower plate for supporting one or more other parts may be attached transversely across the lower plates and provided with one or more flanges to restrain movement of the end of a part resting on the transverse plate.

THE DRAWINGS

DESCRIPTION OF THE PREFERRED EMBODIMENT

Figure 1:
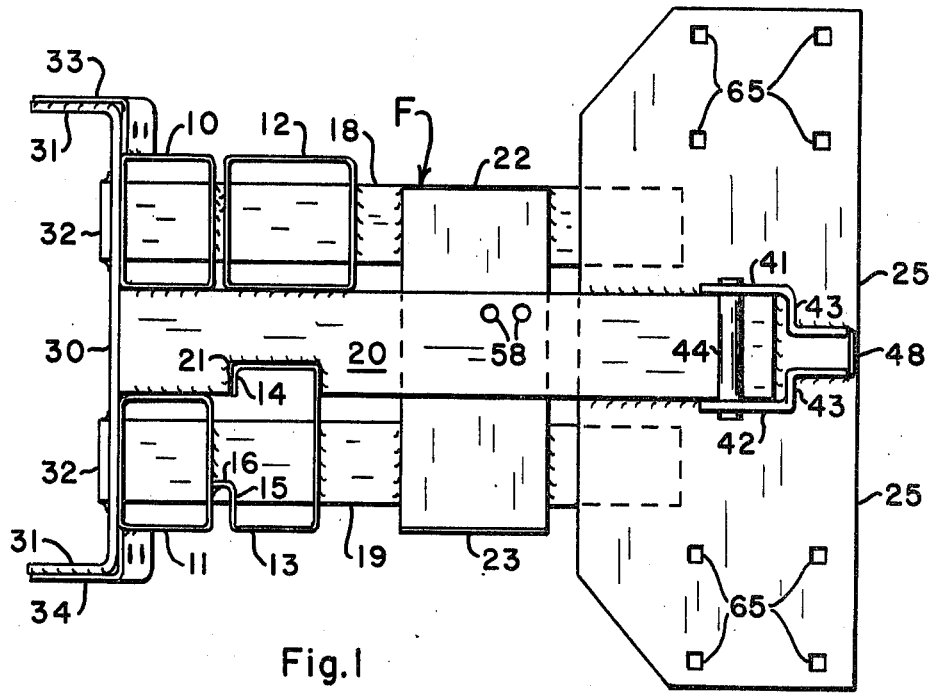
FIG. 1 is a top plan view of a frame for the carrier of this invention.
Figure 2:
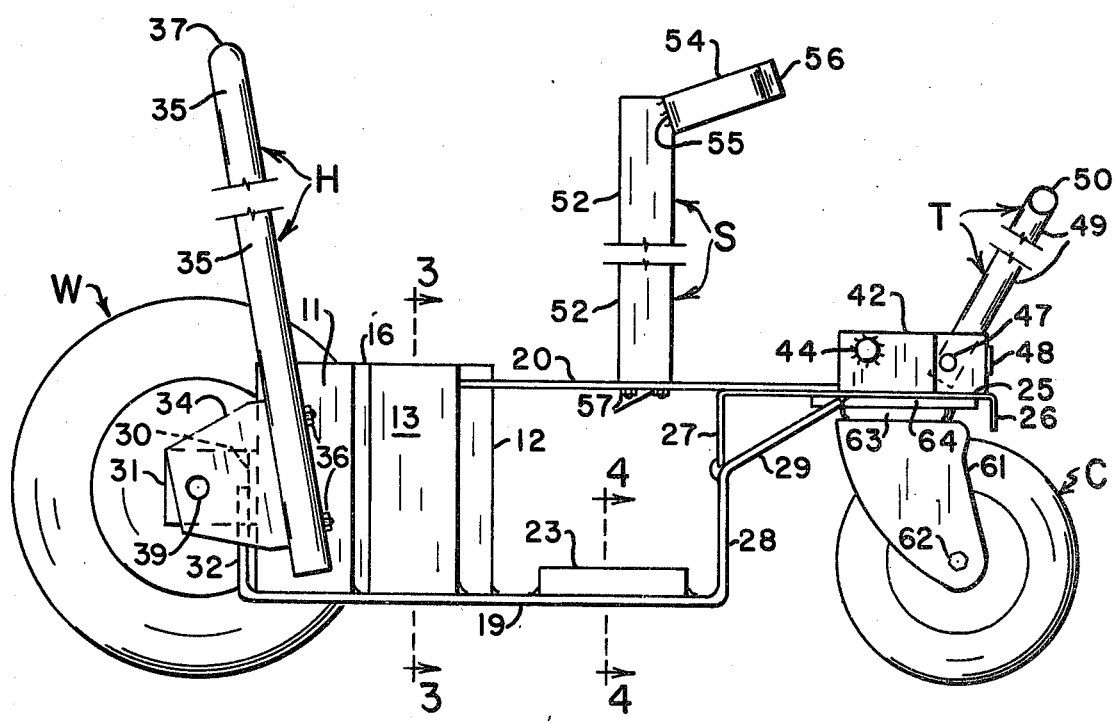
FIG. 2 is a condensed side elevation of the carrier.
Figure 3:
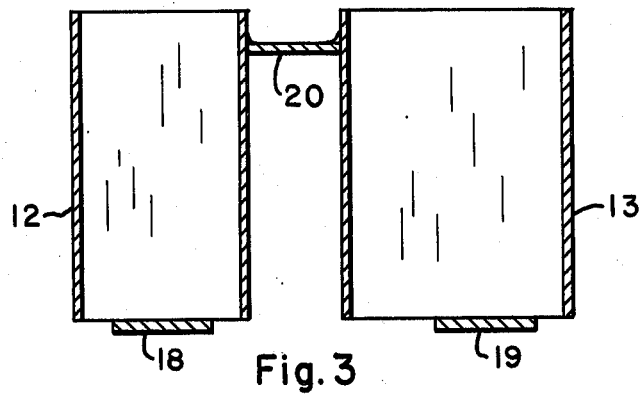
FIG. 3 is a vertical section taken along line 3—3 of FIG. 2.
Figure 4:
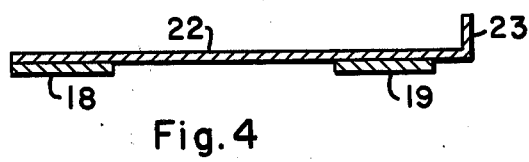
FIG. 4 is a fragmentary vertical section taken along line 4—4 of FIG. 2.

As illustrated in FIGS. 1 and 2, a carrier for storing and transporting generally elongated parts, as of a disassembled device, and constructed in accordance with this invention, includes a frame F of FIG. 1 to which may be attached a support S of FIG. 2 for a cylindrical part to be stored or transported, as well as a pair of rear wheels W and a pair of pivotal front casters C. A rear handle H may be used to tip the frame F rearwardly for movement similar to that of a hand truck, while a front or towing handle T is pivoted about a horizontal axis and may be used to tow the carrier in the manner of a dolly, with the front casters C used for turning purposes. In storage position, the tow handle T, instead of extending forwardly from the frame F, as in FIG. 7, may be tipped upwardly and rearwardly against the cylindrical article resting against the support S.

Figure 8:
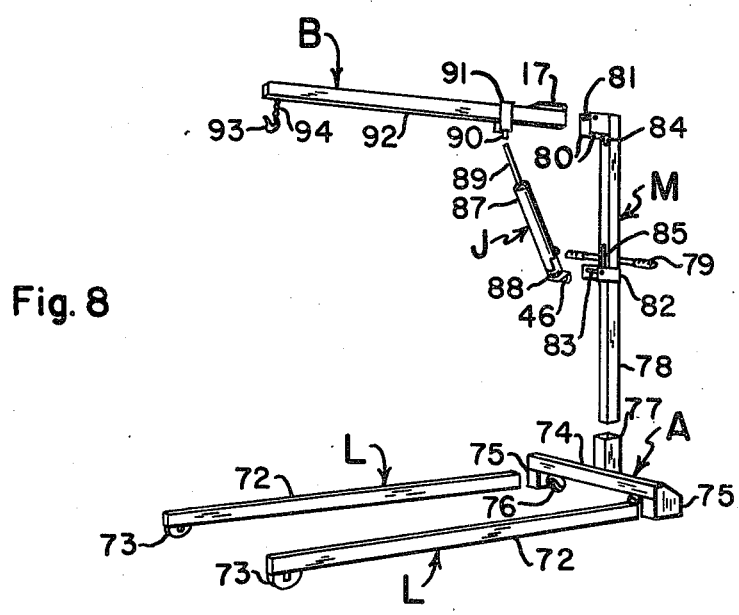
FIG. 8 is an exploded perspective view of a knockdown crane, the parts of which are particularly adapted to be stored on or transported by the carrier, as shown in FIG. 7.

The device particularly adapted to be stored on the preferred embodiment of this invention is a knockdown crane, as of the type illustrated in FIG. 8, which includes a pair of legs L, an axle A with which the legs L interfit, a mast M which is received by the axle A and, in turn, pivotally receives a boom B which extends forwardly above and between the legs L from the upper end of the mast, when in lifting position. A jack J, preferably hydraulic, is pivotally connected to the mast M at a central position of the latter, and is also pivotally connected to the underside of the boom B. In general, when the parts shown in the exploded view of FIG. 8 are assembled together, the jack J is actuated to move, upwardly or downwardly, a load carried at the extended end of boom B.

The frame F, as in FIG. 1, includes a pair of upright, rectangular sockets 10 and 11 adapted to receive the inner ends of the respective legs L of the lifting crane of FIG. 8 and corresponding in peripheral contour to the inner ends of the legs. Forwardly of socket 10 is another upright, rectangular socket 12, larger than socket 11, adapted to receive the lower end of the mast M of the crane of FIG. 8 and corresponding in peripheral contour thereto. Forwardly of socket 11 is an upright socket 13 adapted to receive the inner end of the boom B of FIG. 8 and having a peripheral contour for receiving the same. Thus, socket 13 has a transverse front wall and side walls perpendicular thereto, as shown, with short rear flanges 14 and 15, at the opposite sides, and a rearwardly extending flange 16 at the inner end of flange 15. As will be evident, the lateral extent of socket 13 is greater than the corresponding dimension of the other sockets, to accommodate a clip 17 of boom B, by which the boom is pivotally attached to mast M of FIG. 8. These sockets are mounted on a pair of laterally spaced, longitudinal base plates 18 and 19, with the corresponding lower edge portions of sockets 10 and 12 being attached, as by welding, to base plate 18 and the corresponding lower edge portions of sockets 11 and 13 being similarly attached, as by welding, to base plate 19, while the rearwardly extending flange 16 of socket 13 may be welded to the front edge of socket 11.

A reinforcing plate 20 extends longitudinally at a position above base plates 18 and 19, as in FIG. 2, and between the opposed sockets 10, 11 and 12, 13. The corresponding sides of sockets 10, 11 and 12 are preferably welded to the corresponding edge of reinforcing plate 20, while the latter is provided with an aperture or cutout 21 which accommodates the lateral extent of socket 13 corresponding to rear flange 14 and around the edge of which socket 13 is welded. As will be evident, each of the sockets is securely attached to base plates 18 and 19, as well as to upper reinforcing plate 20. Spaced forwardly of sockets 12 and 13 and extending across base plates 18 and 19, is a cross plate 22 which is welded to the base plates. One end of cross plate 22 may be essentially coterminus with the far side of base plate 18, but at the opposite end, extends laterally beyond the side of base plate 19 to an upturned flange 23. The area inwardly from flange 23 is adapted to receive one end of the axle A of the crane of FIG. 8, with flange 23 restraining lateral movement of the axle in one direction and reinforcing plate 20 restraining lateral movement in the opposite direction.

Figure 5:
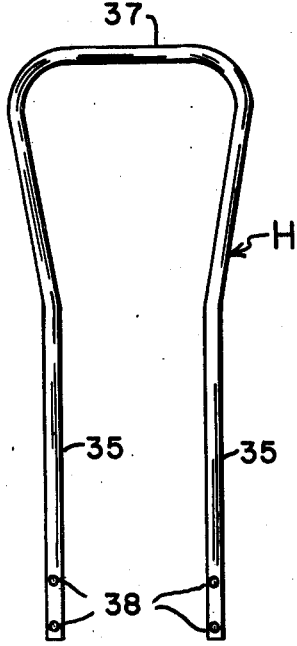
FIG. 5 is a front elevation of a rear handle for the carrier.

A horizontal front plate 25 is provided with a depending front flange 26, as in FIG. 2, and a depending rear flange 27, with both flanges reinforcing the front plate and the rear flange having an additional function, as described below. The reinforcing plate 20 lies atop the front plate 25 and is preferably welded thereto, as indicated. Each of the base plates 18 and 19 are provided with a front upright flange 28 and an upward angular flange 29, with depending flange 27 of the front plate extending downwardly to the lower end of angular flange 29 and being attached thereto, as by welding, while angular flange 29 extends upwardly to the bottom of front plate 25 and its upper end is attached thereto, as by welding. A portion of the front plate 25, its rear depending flange 27 and the angular flange 29 of each of the base plates 18 and 19 thus form a triangular, box-shaped structure which adds considerable strength and rigidity to the frame. At the rear, a bar 30 extends laterally and is provided at each side with a rearwardly extending flange 31, for mounting of the rear wheels W. Bar 30 is also attached to the base plates 18 and 19, through upright rear flanges 32 of the latter attached, as by welding, to the bar. It will be noted that the bar 30 need not be connected to the reinforcing plate 20, but only to the base plates 18 and 19, since the sockets 11–13 connect the base plates with the reinforcing bar 20. Attached to flanges 31 are angular brackets 33 and 34 which are tipped, as in FIG. 2, to permit legs 35 of handle H to be inclined rearwardly and thus dispose the handle at a more convenient position for use. The front leg of each bracket 33 and 34 is provided with holes, as in FIG. 1, for insertion of bolts 36 of FIG. 2 for attachment of legs 35 to the brackets 33 and 34. As in FIG. 5, the legs 35 of the handle H diverge outwardly from an approximately midway position, to provide a more convenient width of the upper end 37 of the handle, which connects the legs, while legs 35 are provided with holes 38 of FIG. 5 for the bolts. Each flange 31 and the corresponding brackets 33 and 34 are provided with aligned holes 39 for insertion of an axle 40 of FIG. 7 for the corresponding wheel W.

To provide a pivotal attachment for tow handle T and a mounting attachment for the lower end of jack J, a pair of brackets 41 and 42, each having an inward offset 43, are attached in upright position to the front plate 25 adjacent the front edge and at the center of the latter, as by welding. Each bracket 41 and 42 has corresponding holes for reception of a pin 44 which receives a clip 46 of jack J, normally used for pivotally attaching the jack to the mast M of FIG. 8. The front portion of brackets 41 and 42 also have opposed holes for receiving a pin 47 on which the lower end of tow handle T is pivoted, with a stop bar 48 being welded across the front end of the brackets 41 and 42 to limit downward movement of the tow handle. The tow handle may include a tube 49 provided adjacent its lower end with a pivot hole for engaging pin 47 and a cross bar 50 attached, as by welding, to the upper end of tube 49.

Figure 6:
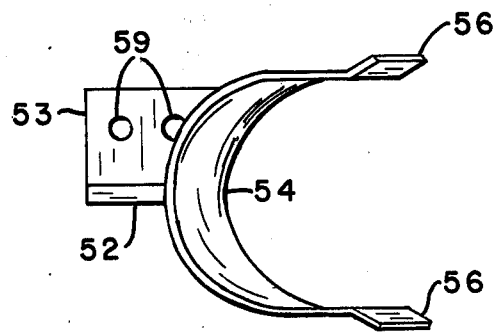
FIG. 6 is a top plan view of a supporting bracket for an essentially cylindrical part to be stored or transported.

The support S, as in FIGS. 2 and 6, includes an upright bracket 52 having a base 53 at its lower end and a cup 54 attached, as by welding, to an inclined edge 55 at the upper end of the bracket, the cup being essentially semicircular, but having outwardly flaring flanges 56. Edge 55 is inclined at an angle corresponding to the centerline of the jack J when the clip 46 at its lower end engages pin 44 and the body of the jack is moved into the cup. The flanges 55 guide the jack into the cup, if slightly misaligned, while the cup merely supports the jack in an inclined position in a rearward direction, so that the dolly may be tipped rearwardly, when used in the manner of a hand truck, through the handle H. However, cup 54 may be formed as a spring clip, if desired. The base 53 of the support is attached to the reinforcing plate 19 by bolts 57 of FIG. 2 which extend through holes 58 of FIG. 1 in plate 20 and holes 59 of base 53.

Each caster C includes a roller 60 mounted for rotation within a fork 61 on a pin 62, while bearings in a race 63 at the top of fork 61 permit the caster to swivel in any direction, in order to follow the line of movement imparted through the tow handle T. The caster further includes a plate 64 to which race 63 is attached by a conventional pivot (not shown), in turn attached to the underside of front plate 25 by suitable bolts, such as carriage bolts, engaging holes 65 which are conventionally square in cross section, to prevent the bolts from turning while the nuts are being tightened thereon.

Figure 9:
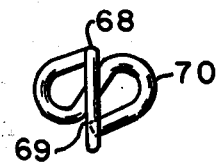
FIG. 9 is an end view of a hook, a pair of which are utilized with an elastic strap in securing the parts to be stored or transported, as illustrated in FIG. 7.
Figure 10:
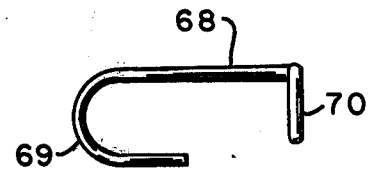
FIG. 10 is a side elevation of the hook of FIG. 9.

As indicated previously, the inner ends of legs L of the knockdown crane of FIG. 8 are placed in the sockets 10 and 11 of FIG. 1, with the lower end of mast M being placed in socket 12 and the rear end of boom B in the socket 13. Also, one end of the axle A rests on the cross plate 21, as indicated in broken lines in FIG. 7. In order to fasten the parts more securely on the carrier, a flexible strap 67, as of rubber or other sufficiently resilient material, is passed around the upstanding parts to be stored or transported, the strap 67 primarily holding axle A in position and preventing it from tipping over, but also asserting a steadying influence on the remaining upstanding parts. Conveniently, cable 67 is provided with a hook 68 at each end, with one hook being removably attached to a leg 35 of the handle H and the strap 67 then passed behind and around the assembled upright parts, and the opposite hook 68 being removably secured to the opposite leg 35 of the handle. Each hook 68 may be constructed in a manner illustrated in FIGS. 9 and 10, having an open loop 69 at one end which is adapted to engage a leg of the handle and an essentially figure eight loop 70 at the opposite end, through which the strap 67 may be threaded and then knotted. When the strap 67 is not in use, it may be wound around the legs 35 and the loops 69 of the hooks attached to the same or opposite legs.

The knockdown crane, the parts of which the preferred embodiment of the carrier of this invention is particularly adapted to receive, is illustrated in the exploded view of FIG. 8 and includes a pair of legs L, each of which includes a channel 72 and a roller 73 pivotally mounted at the outer end. The axle A includes a transversely rectangular tube 74 having a box-shaped structure 75 at each end adapted to provide a socket into which the inner end of the respective channel 72 of the leg L may be inserted. The legs L may be locked in position in the axle in any suitable manner, as by removable pins (not shown) inserted in cooperating holes in the axle and legs. The axle A is also provided with a central, upstanding, rectangular socket 77 which receives the lower end of mast M, while the underside of tube 74 is provided with a pair of casters 76 which permit the axle end of the crane to be moved in an arc, or moved forwardly or rearwardly, with concurrent movement of rollers 73, for adjustment of the position of the crane. The mast M includes an upright rectangular tube 78, the lower end of which is received in a socket 77 and which is provided with an intermediate cross bar 79 having hand grips, as shown, and useable as a handle to move the crane forwardly or rearwardly, or in an arc. At the top of tube 78, a pair of spaced flanges 80 extend forwardly to support between them a pin 81 for pivotal connection of the boom B to the mast, while adjacent the handle 79, another pair of flanges 82 extend forwardly to support between them a pin 83 for pivotal attachment to jack J through engagement with clip 46. The conventional handle for jack J (not shown) is essentially a hollow pipe which, for storage purposes, may be mounted on the mast M by slipping one end onto a pin 84 depending from flanges 80 and engaging the opposite end with a spring pressed socket 85 extending upwardly from flanges 82. The jack J includes a cylinder 88 on which the pin 46 is mounted. Jack J includes an extensible and retractable piston rod 89 which extends upwardly from cylinder 88 for interengagement with a pivoted socket 90, carried by a bracket 91 of boom B. Boom B includes a channel 92 provided at its rear end with clip 17 and at its front end with a hook 93 suspended from channel 92 by a chain 94 which may be affixed or may be adjustable in a conventional manner by inserting different links into a slot (not shown) provided in the top flange of the channel 92. The mast M may be assembled to the axle A, after the legs L have been attached, by inserting the lower end of tube 78 into socket 77 and then securing by a conventional pin (not shown) inserted through coinciding holes in the tube and socket. Jack J may be assembled to the mast M by turning the jack to an essentially horizontal position and slipping the clip 46 over the pin 83, so that the base 88 will bear against pin 83, when the jack is raised to a more nearly upright position, such as that shown. Boom B may be assembled to the mast M by shifting the boom to a nearly upright position and moving the clip 17 upwardly onto pin 81, after which the boom may be pivoted down to a more nearly horizontal position and the rod 89 of jack J inserted into socket 90. The crane is then ready for use by attaching hook 93 to a load and extending or retracting rod 89 to lift or lower the load. Disassembly of the crane is accomplished in a reverse manner to that described for assembly of the crane.

Figure 7:
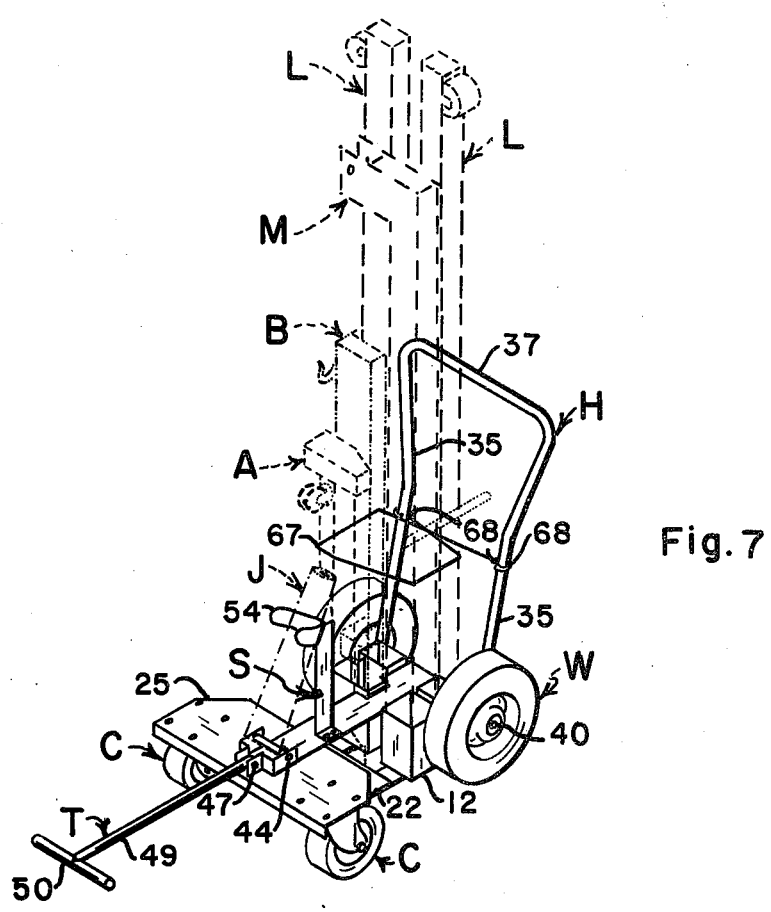
FIG. 7 is a perspective view of the carrier of FIG. 2, on which are mounted the parts of a device particularly adapted to be stored or transported, such parts being shown in broken lines.

After disassembly, the parts of the crane may be placed in the respective positions, such as illustrated in FIG. 7, with the legs, mast and boom in the respective sockets of the hand truck or dolly. Conveniently, rollers 73 of legs L face outwardly from each other, while flange 80 of mast M extends laterally above boom B. Preferably, the axle A is placed on the dolly after the remainder of the upright parts have been placed in the sockets, with one box 75 resting on lower plate 19 and extending beneath the reinforcing plate 20, so that the front edge of the axle, now at the outside, will be restrained laterally by flange 22 of transverse plate 21, while reinforcing plate 20 will restrain lateral movement of tube 74 in the opposite direction. Socket 13 will, of course, restrain rearward movement, while flange 28 of plate 19 restrains forward movement. After placement of axle A, the strap 67 may be passed around the upright parts, including the axle, and hooked to the legs of handle H. Then, the clip 46 of jack J may be slipped under the pin 44 of FIGS. 1 and 2 and the jack tipped rearwardly, for engagement of cylinder 87 with cup 54. As indicated previously, during storage, the tow handle T is merely tipped upwardly and rearwardly against the jack J. For storage purposes, the rod 89 of jack J is preferably retracted into the cylinder 87.

Although a preferred embodiment of this invention has been illustrated and described, it will be understood that other embodiments of this invention may exist, particularly for the storage or transportation of parts of a device which may differ from the parts of the knockdown crane which the preferred embodiment of this invention is particularly adapted to receive. Also, various other changes may be made without departing from the spirit and scope of this invention.

What is claimed is:

1. A carrier for generally elongated parts, comprising:
   a frame including at least one lower, longitudinally extending base plate;
   a series of generally upright sockets mounted on said base plate and having a peripheral contour corresponding to an end of a part to be received by the respective socket;
   an upper, longitudinally extending reinforcing plate to which said sockets on said base plate are laterally attached; and
   means for supporting said frame for movement.

2. A carrier as defined in claim 1, wherein:
   said series of sockets include a plurality of generally rectangular sockets.

3. A carrier as defined in claim 1, including:
   an upright support mounted on said reinforcing plate for engaging an inclined, generally cylindrical part; and
   means mounted on said reinforcing plate for engaging the lower end of said generally cylindrical part.

4. A carrier as defined in claim 3 wherein:
   said supporting means includes an upright bracket and an arcuate member secured to said bracket in an inclined position.

5. A carrier as defined in claim 1, including:
   a wheel at each side of said frame at the rear thereof; and
   a rear handle having a leg extending upwardly and attached to said frame adjacent each wheel, for tipping said frame rearwardly on said wheels and moving said frame to a different place.

6. A carrier as defined in claim 5, including:
   a flexible strap provided with a hook at each end for encircling said parts mounted in upright position on said frame and connected by said hooks to said handle legs.

7. A carrier as defined in claim 5, including:
   a pair of pivotal casters supporting the front of said frame; and
   a tow handle pivotally attached to said frame at the front thereof for towing said frame and storing said handle in a rearwardly tipped position.

8. A carrier as defined in claim 1, including:
   a pair of laterally spaced, longitudinally extending base plates;
   at least one socket on each base plate, said upper reinforcing plate being above the space between said base plates and attached to said sockets; and
   a transverse plate extending across said base plates at a position adjacent said sockets and adapted to support the lower end of a part having a lower peripheral contour differing from said sockets.

9. A carrier as defined in claim 8, including:
   a rear handle having a leg extending upwardly at each side; and
   a flexible strap provided with a hook at each end for encircling said parts mounted in upright position on said frame and connected by said hooks to said handle legs, said parts including parts received in said sockets and said part whose lower end is supported by said transverse plate.

10. A carrier for generally elongated parts, comprising:
    a frame including a pair of lower, longitudinally extending, laterally spaced base plates;
    means for supporting said frame for movement;
    at least one upright socket mounted on and attached to each base plate;
    an upper, longitudinally extending reinforcing plate disposed between and attached to said sockets on the respective base plates; and
    said reinforcing plate having at least one cutout to receive the side of a socket.

11. A carrier as defined in claim 10, including:
    a transverse plate extending across said base plates at a position adjacent said sockets and adapted to support the lower end of a part having a lower peripheral contour differing from said sockets, said transverse plate having means upstanding at one lateral edge to limit lateral outward movement of said last mentioned part.

12. A wheeled carrier for receiving parts of a knockdown lift crane including a pair of elongated legs having a roller on the underside at the front end, an axle having a socket at each side for receiving the rear ends of said legs in transverse relation, casters on the underside and a central, upstanding socket, a mast having a lower end receivable in said axle socket, an intermediate handle, an intermediate transverse pivot pin and an upper transverse pivot pin, a boom having a clip at its rear end for engaging said upper pin of said mast and a jack having a base clip for engaging the intermediate pivot pin of said mast, said jack having a cylindrical body, the rear ends of said legs and the lower end of said mast having a generally rectangular cross section and the rear end of said boom being rectangular with said clip on one side thereof, said carrier including:
    first and second lower, laterally spaced, longitudinally extending base plates having an upright rear flange and an upright front flange provided with an angular, upwardly extending flange;
    a horizontal, transverse front plate having a depending rear flange attached to the juncture of said upright front and angular upward flanges of said base plates, the upper ends of said angular flanges being attached to the underside of said front plate;
    first and second upright, rectangular sockets mounted on and attached to said first base plate, adjacent the rear thereof;
    a third upright, rectangular socket mounted on the second base plate at the rear thereof;
    a fourth upright socket having a transverse front wall and longitudinal side walls mounted on and attached to said second base plate, said fourth socket having short upright flanges extending transversely from the rear edges of said side walls and a flange extending rearwardly from the outer rear flange for attachment to the front wall of said third socket, said fourth socket extending laterally toward said first base plate a greater distance than said third socket;

said first and third sockets receiving the rear ends of said legs with said legs in upright position, said third socket receiving the lower end of said mast with said mast in upright position and said fourth socket receiving the rear end of said boom, with said boom in upright position;

an upper, longitudinal reinforcing plate attached to said front plate and extending rearwardly at a position above said base plates, between said first and second sockets, on one side, and said third and fourth sockets, on the other side, one side edge of said reinforcing plate being attached to said first and second sockets and the opposite side edge to said third socket, said reinforcing plate having a cutout into which the corresponding side of said fourth socket extends for attachment to said reinforcing plate;

means mounted on said front plate for engaging said base clip of said jack; and an upright bracket mounted on said reinforcing plate having an inclining semicircular cup with outwardly extending flanges for engaging said jack in a rearwardly inclined position.

13. A carrier as defined in claim 12, wherein:

said carrier is provided with front pivotal casters and rear wheels, a rear handle having upright legs and a front, pivotally mounted tow handle;

a rear bar extends transversely, is attached to upright rear flanges of said first and second base plates and is provided at each side with means for attaching said rear wheels and the legs of said rear handle;

said casters are attached to the underside of said front plate;

a pair of laterally spaced, upright bracket arms are attached to said front plate adjacent the front edge thereof, said arms having inward offsets to space the rear portions thereof a greater distance apart than the front portions;

a first pin extends laterally between the rear portions of said arms for engagement with said base clip of said jack; and a second pin extends laterally between the front portions of said arms for pivotal connection with said tow handle, said tow handle being pivotal rearwardly to a storage position.

14. A carrier as defined in claim 13, wherein:

a plate is attached to the front edges of said arms to provide a stop for said tow handle.

15. A carrier as defined in claim 12, including:

a transverse plate extending across said base plates adjacent said sockets for supporting said axle in an upright position.

* * * * *